April 27, 1926.
E. J. McDERMOTT
MUD LUG FOR AUTOMOTIVE VEHICLES
Filed April 20, 1925
1,582,180
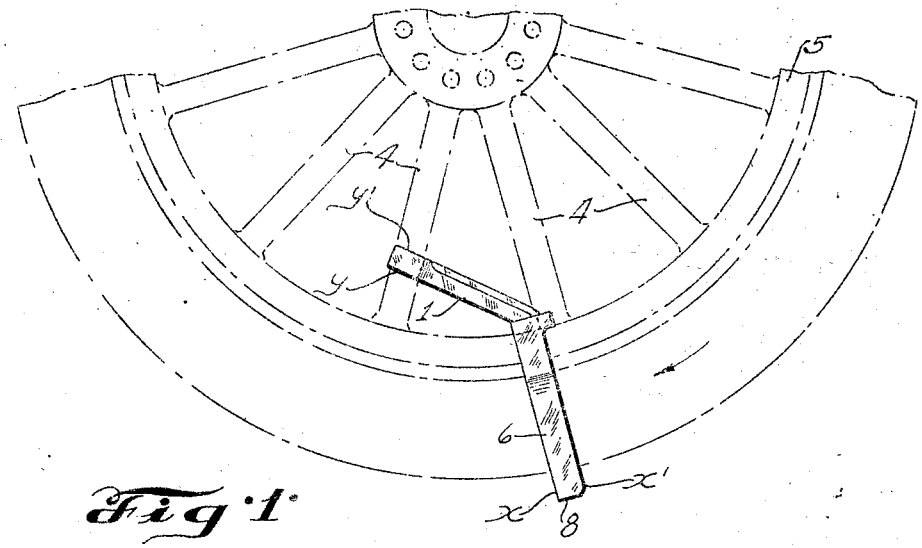
Fig. 1.
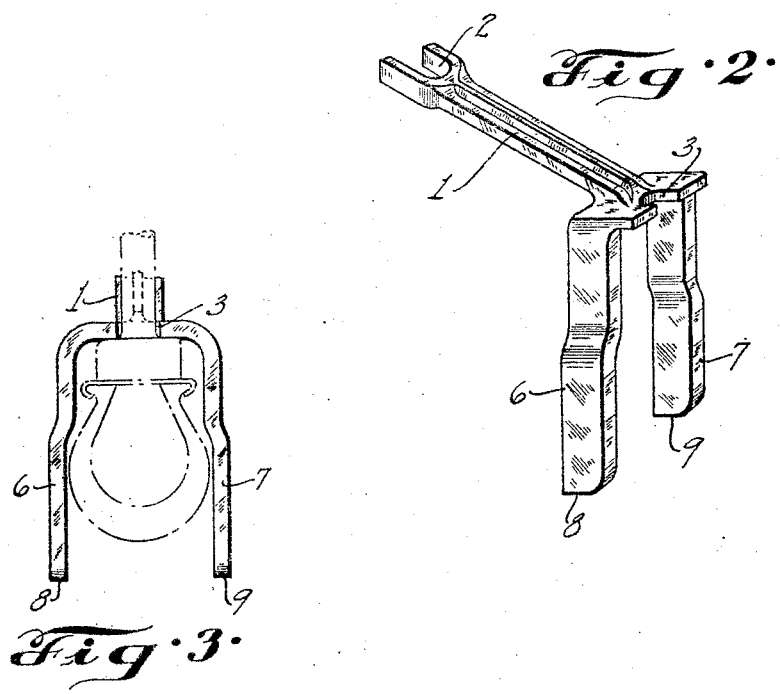
Fig. 2.
Fig. 3.
INVENTOR
Edward J. McDermott.
By W. L. Dempsey,
ATTORNEY Patented Apr. 27, 1926.

1,582,180

UNITED STATES PATENT OFFICE.

EDWARD J. McDERMOTT, OF ST. LOUIS, MISSOURI.

MUD LUG FOR AUTOMOTIVE VEHICLES.

Application filed April 20, 1925. Serial No. 24,416.

*To all whom it may concern:*

Be it known that I, EDWARD J. McDERMOTT, a citizen of the United States, residing in the city of St. Louis, State of Missouri, have invented a certain new and useful Improvement in Mud Lugs for Automotive Vehicles, of which the following is a full, clear, and exact specification.

My invention relates to mud lugs for automotive vehicles and particularly to that class which may be quickly attached and detached.

The object of my invention is to provide a mud lug that may be easily and readily affixed to an automobile wheel without bolts, hooks or other fastenings that require tools.

Another object of my invention is to provide a mud lug which presents sufficient surface to contact with a muddy road to ensure a rolling motion of the wheel under all conditions of road and, also, to provide a mud lug of greater strength and durability that can be made and sold at a very low price.

Referring to the drawings:

Fig. 1 is a side elevation of my device, applied to the wheel.

Fig. 2 is a perspective view.

Fig. 3 is a front elevation.

Different road conditions require different devices to cause the drive-wheels of automotive vehicles to roll over the surface of the road instead of revolving in one place, which often occurs on steep, slippery grades in muddy roads. Under these conditions, a large portion of the available power of the engine is lost by being absorbed in the friction of the drive wheels rotating against the road, instead of rolling over it.

At the same time, the maximum power of the engine is often used, the driver thinking thereby to get out of his difficulty, hence the conventional non-skid chains are often broken requiring some minutes of very dirty and disagreeable work to repair and replace them.

Again, in deep, soft mud the ordinary chain does not present sufficient surface to the mud to enable the car to pull out.

To overcome these difficulties and objections, I have devised a very sturdy, durable and effective mud lug that can be readily and quickly attached to or detached from the wheel without the use of any tools, and one that has greater strength so that it is not liable to break or become loosened, thus necessitating repair or replacement at the time the car is stuck in the mud.

In Fig. 1, I have shown a portion of a drive wheel of an automobile with my lug in operative position, the body 1 being provided with semi-circular grooves 2 and 3 at each end, adapted to engage the spokes 4 of the wheel, the groove 3 contacting with the spoke where it joins the felly 5, and the groove 2 contacting with the spoke at a suitable distance from the felly 5. The branches 6 and 7 are disposed one on each side of the felly 5, and the tire casing, as shown in Fig. 3. The ends 8 and 9 of the branches 6 and 7 extend beyond the periphery of the tires, a suitable distance to give them firm contact with the road. The body and branches are integral and the branches may be suitably curved to more completely harmonize with a cross section of the felly and tire than is shown in the drawings.

My mud lug is readily attached by straddling the felly and tire with the branches and then pressing down upon the body 1 until the grooves 2 and 3 contact with the spokes.

It is evident that when the wheel is rotated in the direction indicated by the arrow point, the pressure against the point of the lug at $x$ will tend to depress the upper end of the body at $y$, thus tending to tighten the grip of the lug upon the wheel and when it is desired to release the lug the reverse rotation of the wheel will exert pressure against the opposite side of the lug at $x'$ which will cause the opposite end of the body to raise at $y'$, thus releasing the lug.

Should it be desired to back the car, the mud lug would be placed on the wheel in reverse position to that shown in Fig. 1.

Having fully described my invention, I claim:

A mud lug for automotive vehicles, comprising a body portion having semi-circular grooved ends adapted to fit the opposite sides of two spokes of a wheel when inserted between the spokes, in such a manner that the adjacent and opposite angles formed will be greater and less, respectively, than a right-angle, and having two branches integral with said body, adapted to straddle the felly and tire of an automobile wheel and extend beyond the periphery of said tire a suitable distance to contact with the ground, said branches being disposed relatively to said body portion at an angle greater than a right-angle and less than a straight angle.

In witness whereof I have hereunto affixed my signature this 16 day of April 1925.

EDWARD J. McDERMOTT.